United States Patent
Lynch et al.

(10) Patent No.: US 9,712,972 B2
(45) Date of Patent: Jul. 18, 2017

(54) METHOD, SYSTEM AND DEVICE FOR DETERMINING CLOSE PROXIMITY OF TWO OR MORE PERSONS

(71) Applicant: FAXI LIMITED, London (GB)

(72) Inventors: Tony Lynch, London (GB); Francois Planke, Evry (FR); Lewis Kite, London (GB); Dong Yuan, Enfield (GB)

( * ) Notice: Subject to any disclaimer, the term of this patent is extended or adjusted under 35 U.S.C. 154(b) by 0 days.

(21) Appl. No.: 15/077,950

(22) Filed: Mar. 23, 2016

(65) Prior Publication Data

US 2016/0286352 A1 Sep. 29, 2016

(30) Foreign Application Priority Data

Mar. 24, 2015 (GB) .................................. 1504993.4

(51) Int. Cl.
*H04W 68/00* (2009.01)
*H04W 4/02* (2009.01)
(Continued)

(52) U.S. Cl.
CPC ............. *H04W 4/023* (2013.01); *H04L 67/20* (2013.01); *H04W 4/008* (2013.01); *H04W 4/021* (2013.01);
(Continued)

(58) Field of Classification Search
CPC ..... H04W 4/023; H04W 8/005; H04W 4/021; H04W 4/08; H04W 4/008; H04W 4/046; H04L 67/20
(Continued)

(56) References Cited

U.S. PATENT DOCUMENTS

| | | | |
|---|---|---|---|
| 8,588,690 B2* | 11/2013 | Turtinen | H04W 8/005 370/328 |
| 2005/0228715 A1* | 10/2005 | Hartig | G08G 1/14 705/13 |

(Continued)

FOREIGN PATENT DOCUMENTS

| | | |
|---|---|---|
| WO | WO2015005948 A1 | 1/2015 |
| WO | WO2015018267 A1 | 2/2015 |

OTHER PUBLICATIONS

United Kingdom Intellectual Property Office (UKIPO), Search Report for United Kingdom application GB1504993.5, Aug. 25, 2015, p. 1, UKIPO.
European Patent Office (EPO), Search Report for Europoean patent application EP16161296, Aug. 10, 2016, p. 1-2, EPO.

*Primary Examiner* — Babar Sarwar (57) ABSTRACT

Provided is a computer implemented method of determining that two or more members of a subscription group are in close proximity to each other. The method comprises the steps of enabling a mobile electronic device of at least one member of the subscription group to use a short range wireless communication module to detect other mobile electronic devices. In response to detecting, the detecting mobile electronic device receives and stores a unique identifier for each detected other mobile electronic device. A processor compares each stored unique identifier with known unique identifiers of mobile electronic devices of members of said subscription group. As a consequence of the comparing step, the processor determines that two or more members of the subscription group are in close proximity to each other if at least one of the stored unique identifiers matches one of the known unique identifiers of mobile electronic devices of members of the subscription group. This method can be used to infer that the two or more members of the group are sharing the same vehicle for a journey. When one of the mobile electronic devices is (Continued)

detected as having reached a location on or within a boundary of a geo-fence associated with a carpark, data is communicated to a system or device of a third party associated with the carpark to alert the third party and/or provide the third party with data indicative of an identity of the vehicle and/or its driver to enable the driver to access car-parking spaces allocated to car share vehicles.

20 Claims, 1 Drawing Sheet

(51) Int. Cl.
    *H04W 4/00*     (2009.01)
    *H04W 4/04*     (2009.01)
    *H04L 29/08*     (2006.01)
    *H04W 4/08*     (2009.01)
    *H04W 8/00*     (2009.01)

(52) U.S. Cl.
    CPC ............ *H04W 4/046* (2013.01); *H04W 4/08* (2013.01); *H04W 8/005* (2013.01)

(58) Field of Classification Search
    USPC ............... 455/404.2, 410–411, 412.1–414.2,
                    455/418–422.1, 456.1, 552.1, 450, 452.1,
                    455/41.1–41.2, 456.2, 457, 550.1;
                    370/310.2, 328, 338, 341, 348
    See application file for complete search history.

(56) References Cited

U.S. PATENT DOCUMENTS

| | | | |
|---|---|---|---|
| 2006/0253226 A1* | 11/2006 | Mendelson | G08G 1/14 701/1 |
| 2011/0111726 A1* | 5/2011 | Kholaif | G01S 1/68 455/404.2 |
| 2011/0137773 A1 | 6/2011 | Davis, III et al. | |
| 2011/0320243 A1* | 12/2011 | Khan | G06Q 20/3278 705/13 |
| 2012/0265434 A1* | 10/2012 | Woodard | G08G 1/147 701/423 |
| 2013/0073350 A1* | 3/2013 | Blustein | G08G 1/14 705/13 |
| 2013/0176147 A1* | 7/2013 | Anderson | G08G 1/143 340/932.2 |
| 2013/0231088 A1* | 9/2013 | Jabara | G06Q 10/101 455/411 |
| 2014/0372185 A1* | 12/2014 | Ganot | G07B 15/02 705/13 |
| 2014/0375480 A1* | 12/2014 | Morgan | H04W 4/021 340/990 |
| 2015/0126123 A1* | 5/2015 | Qin | H04L 41/06 455/41.2 |
| 2016/0050699 A1* | 2/2016 | Boss | H04L 67/12 455/41.2 |
| 2016/0150390 A1* | 5/2016 | Chen | H04W 68/00 370/311 |

\* cited by examiner

METHOD, SYSTEM AND DEVICE FOR DETERMINING CLOSE PROXIMITY OF TWO OR MORE PERSONS

FIELD OF THE INVENTION

The invention relates to a method, system and device for determining the close proximity of two or more persons over a period of time and, more particularly, but not exclusively to a method, system and device for enabling two or more persons occupying a high occupancy vehicle (HOV) to access reserved car-parking for HOVs.

BACKGROUND OF THE INVENTION

Businesses, schools, hospitals, business districts, shopping centres, towns and whole cities are increasingly experiencing issues with vehicle congestion and parking. Some businesses have identified that some of their employees are spending up to an hour each morning attempting to find a parking space, with some employees being forced by lack of easy access to parking facilities to park so far from their place of work that they then need to take an additional bus journey to reach their place of employment. Public utilities such as hospitals and schools have reported that, come the morning rush hour, access to their premises often becomes blocked as large local traffic volumes reduces access to and from their parking areas. In many cases, the schools and hospitals have been forced to employ traffic marshals at the peak morning and afternoon traffic times in order to control the traffic and avoid traffic gridlock and other traffic related problems.

This has far reaching financial and human effects, both for the locus of these regular journeys and those undertaking the journeys, such as lost productivity, increased or additional costs to employers, schools, local authorities, etc., increased cost of transport for commuters, loss of quality of life and reduced safety.

Two of the key factors identified by employers and schools across the country as being able to help alleviate this issue are modal change and vehicle sharing. This includes encouraging people to walk, to cycle or to use public transport and, for those who still need to drive, to encourage multiple occupancy of vehicles, i.e. car sharing.

One of the key issues identified so far as retarding the promotion of car sharing schemes has been policing or authenticating the activity, i.e. proving that car sharing has or has not taken place. The lack of any easily implementable and secure schemes for verifying that car sharing has indeed taken place is currently a major factor in dissuading employer organisations from adopting and/or promoting car sharing schemes to their employees as alternatives to current travel habits. In the USA, where 'High Occupancy Vehicle' (HOV) lanes have been employed to promote car sharing for many years, commuters have been known to buy manikins to appear to be car sharing when they are not in fact doing so. This then forces transport authorities to invest in costly infra-red cameras to detect the presence, or absence, of another person in the vehicle other than the driver. Some existing schemes investigated in the UK use a system of passes that commuters display on the dashboard of the vehicle they travelled in. However, as there is no easy way of uniquely tying a pass to a traveler at a time of travel, these are easily and frequently defrauded. Even when the parking authorities suspect that a vehicle is making use of a space reserved for car sharers without having been involved in a multiple occupancy journey there is little they can do to impose sanctions on the vehicle or its owner as there is no concrete evidence that no sharing took place.

Despite the current issues affecting the take up of car sharing schemes by both organisations and their employees, car sharing as an alternative to existing commuter transport mechanism is regarded very favourably by commuters as reducing the environmental impact of vehicle use, reducing congestion and reducing the costs of commuting. Consequently, it is envisaged that the provision of user friendly applications which enable commuters and their employers to implement car sharing would greatly promote the uptake of a car sharing scheme according to the invention.

OBJECTS OF THE INVENTION

An object of the invention is to mitigate or obviate to some degree one or more problems associated with known vehicle sharing schemes.

The above object is met by the combination of features of the main claims; the sub-claims disclose further advantageous embodiments of the invention.

Another object of the invention is to mitigate or obviate to some degree one or more problems associated with known high occupancy vehicle parking schemes.

Another object of the invention is to determine the close proximity of a number of persons over a period of time to at least infer that they have shared the same vehicle of a journey.

Another object of the invention is to determine the close proximity of a number of persons over a period of time without tracking the users' geolocations over time.

One skilled in the art will derive from the following description other objects of the invention. Therefore, the foregoing statements of object are not exhaustive and serve merely to illustrate some of the many objects of the present invention.

SUMMARY OF THE INVENTION

The invention seeks to provide a method of determining that two or more members of a subscription group are in close proximity to each other. The method can be used to infer that the two or more members of the group are sharing the same vehicle for a journey. When one of the mobile electronic devices of the group members is detected as having reached a location on or within a boundary of a geo-fence associated with a carpark, data is communicated to a system or device of a third party associated with the carpark to alert the third party and/or provide the third party with data indicative of an identity of the vehicle and/or its driver to enable the driver to access car-parking spaces allocated to car share vehicles.

In a first main aspect, the invention provides a computer implemented method of determining that two or more members of a subscription group are in close proximity to each other, the method comprising the steps of: enabling a mobile electronic device of at least one member of the subscription group to use a short range wireless communication module to detect other mobile electronic devices and, in response to detecting, to receiving and storing a unique identifier for each detected other mobile electronic device; at a processor, comparing each stored unique identifier with known unique identifiers of mobile electronic devices of members of said subscription group; and determining that two or more members of the subscription group are in close proximity to each other if at least one of the stored unique identifiers matches one of the known unique identifiers of mobile electronic devices of members of said subscription group.

In a second main aspect, the invention provides a computer implemented method of determining that two or more persons are in close proximity to each other, the method comprising the steps of: enabling a mobile electronic device of at least person to use a short range wireless communication module to detect other mobile electronic devices and, in response to detecting, to receiving and storing a unique identifier for each detected other mobile electronic device; at a processor, comparing each stored unique identifier with known unique identifiers of mobile electronic devices of previously identified persons; and determining that two or more previously identified persons are in close proximity to each other if at least one of the stored unique identifiers matches one of the known unique identifiers of mobile electronic devices of previously identified persons.

In a third main aspect, the invention provides a mobile electronic device for determining that two or more members of a subscription group are in close proximity to each other, the device comprising: a memory storing machine readable instructions; a processor configured to execute said machine readable instructions to implement the steps of the method according to any one of the first or second main aspects of the invention.

In a fourth main aspect, the invention provides a system for determining that two or more members of a subscription group are in close proximity to each other, the system comprising; a server having a memory storing machine readable instructions and a processor configured to execute said machine readable instructions; a mobile electronic device having a memory storing machine readable instructions and a processor configured to execute said machine readable instructions; the server and the mobile electronic device being configured to communicate with each other over a network; wherein the server and the mobile device are configured to interoperate to implement the steps of the method according to any one of the first or second main aspects of the invention.

In a fifth main aspect, the invention provides a computer readable medium storing machine readable instructions executable by a processor of a mobile electronic device for implementing the steps of the method according to any one of the first or second main aspects of the invention. The computer readable medium is a non-transitory computer readable medium.

In a sixth main aspect, the invention provides a computer readable medium storing machine readable instructions executable by a processor of a server for implementing the steps of the method according to any one of the first or second main aspects of the invention. The computer readable medium is a non-transitory computer readable medium.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be understood that the elements shown in the figures, may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The invention aims to provide a system to determine the close proximity of previously identified users via their smart phones, other mobile internet connected devices, or mobile electronic devices for their participation, for example, in transport oriented incentive schemes, but the invention is not limited to determining close proximity of users for car sharing and parking purposes, but could be used for determining close proximity of previously identified users for any purpose. The invention involves the creation and provision of software in the form of mobile and server-side applications enabling multiple mobile operating systems that permit mobile devices to detect other devices to receive their unique identifiers and to provide other functionality, especially relating to sharing of scarce assets such as carparks. The mobile-side application can be downloaded to mobile electronic devices from the service provider server or by any other appropriate or known means.

Figure 1:
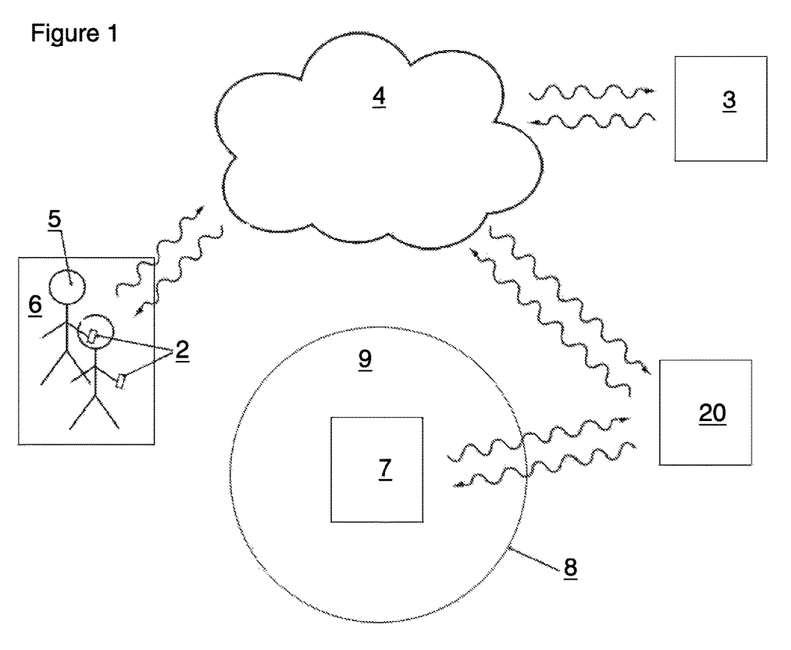
FIG. 1 is a diagram of an example of a system according to the present invention.

Referring to the figures, the system 1 of the invention may comprise a number of user devices 2 and a system server 3 and may include a third party entity server 20. The user devices 2 may comprise handheld and/or mobile electronic devices such as smart phones, tablet computers or the like 2. Each of the user devices 2 may be capable of communicating with at least the system server 3 through a network such as a wireless communication network and/or the Internet 4, although this is not essential where the method of the invention is wholly carried out in one or more of the electronic devices 2 in which cases the devices 2 may be configured to connect directly through the network 4 to the third party entity server 20. In some embodiments, the system server 3 and the third party entity server 20 are hosted in one server device. Although, for clarity, only a small number of electronic devices 2 are shown in FIG. 1, it will be understood that, in practice, the system 1 may comprise a large number of electronic devices 2.

Figure 2:
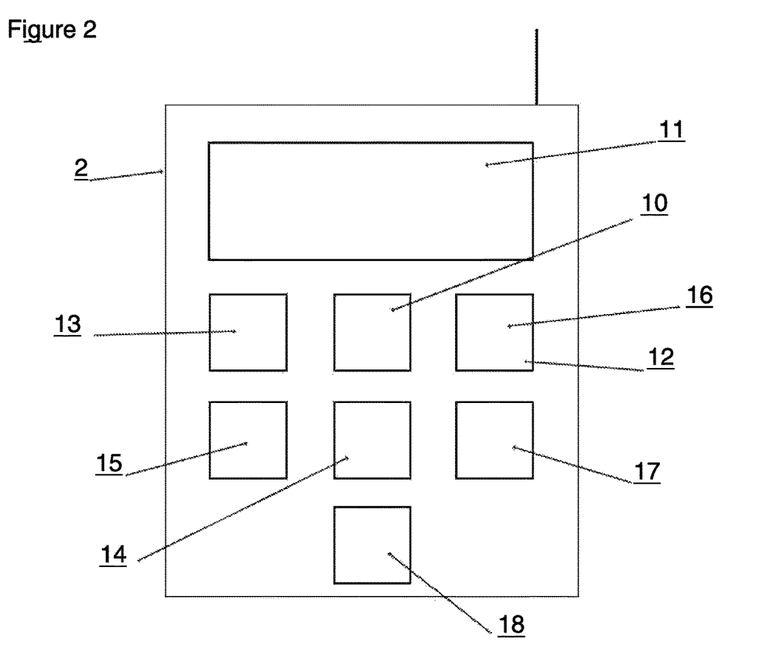
FIG. 2 is a diagram of an example of a user device used in the system of FIG. 1.

FIG. 2 illustrates an example of an electronic device 2 of the system 1 in more detail. As shown in FIG. 2, an electronic device 2 includes a data processor 10, a visual display 11, a user interface 12 allowing user instructions to be input to the device 2 and information to be presented and/or displayed to the user, a speaker 13 and a microphone 14. The various components of the electronic device 2 operate under the control of the processor 10 running machine code stored in a memory of the electronic device 2. The user interface 12 may be integrated with the visual display as a touch screen display. In other examples the user interface 12 may be a dedicated keypad separate from the visual display or a combination of the two. The mobile electronic device 2 includes a short range wireless communication module 18 such as a BlueTooth™ and/or a WiFi™ communication module 18. Electronic devices including these components are well known to the skilled person, so these need not be described in detail here.

Further, the electronic device 2 may comprise one or more of a location determining means 15, a mapping or navigation module 16, and a location identifying module 11. The navigation module 16 and location identifying module 17 may be arranged to receive position information from the location determining means 15. In the illustrated example the location determining means 15 is operable with a global positioning system such as the so-called GPS. In other examples different satellite based navigation systems may be used. The navigation module 16 and the location identifying module 17 may comprise dedicated hardware, or may comprise software programs or applications running on a processor 10 of the electronic device 2.

The location identifying module 17 may use the position information provided by the location determining means 15 to provide location based services to a user through suitable applications running on the electronic device 2. Such applications may be downloaded to the device from a network server or the like.

For clarity, the operation of the system 1 with an electronic device 2 will be discussed.

Generally speaking, a first electronic device 2 has downloaded thereon a mobile device application for enabling it to determine that two or more persons using respective mobile electronic devices 2 are in close proximity to each other. The application may be downloaded from an application service provider hosted by the system server 3. More specifically, the downloaded application may enable the first mobile electronic device 2 to determine that two or more members of a subscription group are in close proximity to each other. The mobile application, when executing, may configure the mobile device 2 to be in a discoverable mode thereby negating the need for a group member to manually enable discoverable mode on their mobile device 2.

A subscription group can be considered as a group of persons or members of a service that are somehow associated with one another as an identifiable group of subscribers amongst all subscribers of the service. The service provider system such as system server 3 may associate the members of a group through unique identifiers which may be allocated or belonging to their respective mobile electronic devices 2 or allocated to the members of the group and inputted to their respective mobile devices. Such unique identifiers may comprise a mobile device's BlueTooth™ address, WiFi™ address, international mobile subscriber identity (IMSI) or any other unique identifier allocated to the subscriber or to the subscriber's mobile device.

The method may be implemented by one of the mobile electronic devices 2, e.g. a 'first mobile electronic device' 2 for the ease of describing the method of the invention, or by two, more than two, or all of the group members' electronic devices 2. Where the application relates to car sharing, a group may be limited to a specified number of members, e.g. four for a normal car, or the limit on the number of members may be based on the model of the group vehicle.

The method comprises enabling the first mobile electronic device 2 (of one group member) to use a short range wireless communication module 18 to detect other group members' mobile electronic devices 2, although, of course, where the short range wireless communication module 18 is a BlueTooth™ module or a WiFi™ module, the first mobile electronic device 2 may detect any suitably enabled electronic devices within the range of its short range wireless module 18. As such, it may detect devices of other persons not forming part of the group of previously known persons, i.e. not comprising members of the subscription group, but this is easily addressed by the mobile-side application executing on the first electronic device 2 and/or by the server-side application. Alternatively, the first mobile device 2 may be configured to only detect other mobile devices also executing the same mobile-side application.

The detection step may be performed passively or actively by the first mobile device 2. Passive detection may comprise the first mobile device 2 receiving signals from other mobile devices and obtaining their unique identifiers. Active detection may comprise the first mobile device 2 scanning for other mobile devices to detect and obtain their unique identifiers. In the following description, reference will be made to the first mobile device 2 actively detecting for other devices by scanning, but it should be understood that the steps of the method so described can also be implemented through passive detection.

BlueTooth™ or WiFi™ communication modules are preferred given their relatively short effective range of a few meters or a few tens of meters. BlueTooth™ is particularly preferred because its effective range is normally ten meters or less and as little as 5 meters where the signal is attenuated by physical barriers such as a vehicle's body shell, doors and windows, especially when the doors and windows are closed. In response to scanning, the first mobile device 2 receives from each detected other mobile electronic device 2 a unique identifier such as its BlueTooth™ Medium Access Control (MAC) address and/or its WiFi™ MAC address, although other unique identifiers may be utilized. This can be achieved without any pairing between the first mobile device 2 and any of the detected other mobile devices 2, although pairing is not precluded in some embodiments of the invention.

The method includes comparing each stored unique identifier with known unique identifiers of mobile electronic devices 2 of previously identified persons, e.g. subscription group members, and determining that two or more of the previously identified persons are in close proximity to each other if at least one of the stored unique identifiers matches one of the known unique identifiers of the mobile electronic devices 2 of previously identified persons. Where the comparison step is implemented by the first electronic device 2, said device 2 'knows' that its group member is the first candidate of the 'two or more of the previously identified persons in close proximity to each other'. As such, the first electronic device 2 does not need to compare its own unique identifier with any of the known unique identifiers. Where the first mobile device 2 matches a stored identifier of one of the detected mobile devices 2 with one of the known identifiers, it can deduce that its group member is now in close proximity to the group member associated with the device of the matched identifier. Where, when comparing a stored identifier with the known identifiers, the first electronic device 2 fails to make a match, it can discard the failed identifier as belonging to a device of an unknown person, i.e. not a subscription group member.

This method can be used to infer that the two or more members of the group identified as being in close proximity with each other are sharing the same vehicle for a journey.

In one embodiment, a processor of the first mobile device 2 implements the comparison step. In such a case, the first mobile device 2 may already be provided with the known identifiers for the subscription group. Alternatively, the first mobile device 2 may retrieve said known identifiers from the system server 3 in response to a request. The first mobile device may send a request including its own unique identifier or another identifier or identification data to the server 3. Upon receiving the request, the server uses the identifier or other identification data received from the first mobile device to determine which subscription group the user of the first mobile device 2 belongs to and then returns to it the unique identifiers and/or other data for members of the group, or the remainder of the group save for itself.

In one embodiment, whilst the first mobile device 2 implements the scanning step, another one of the mobile devices 2 detected as being in close proximity may implement the comparison step. In this case, the first mobile device 2 sends the scanned identifiers to the other mobile device 2.

In one embodiment, each mobile device of group members may implement the scanning and/or comparison steps and may share the results of such steps with other devices 2 of the group once proximity of the devices 2 is determined, especially where the steps of the method are implemented periodically by way of verifying or confirming earlier results or by way of keeping a record of proximity results over a period of time.

In one embodiment, the comparison step is performed by the system server 3 whereby the first mobile device 2 or one of the other mobile devices 2 transmits to the server 3 the detected unique identifiers from the scanning step possibly including its own unique identifier.

In one embodiment, one or more or each mobile electronic device 2 may periodically scan for other mobile electronic devices 2 and, in response to scanning, receive and store a unique identifier for each detected other mobile electronic device at each scan. This may include obtaining time and/or location data of the scanning device 2 for two or more of the periodic scans. This may also include processing the periodic stored data to determine that the two or more of the subscription group members have been in close proximity for a period of a journey in a same vehicle.

An alternative to periodic scanning is to allow the mobile devices 2 to pair as scanning in older models of mobile devices may make heavy use of the device's battery power supply. The mobile devices 2 may be enabled to pair as part of the first scanning process.

In one embodiment, the mobile device, i.e. mobile side, application configures each mobile device to issue a signal through its short range wireless communication module 18 providing their unique identity such that the first mobile electronic device (and indeed all of the mobile devices) can receive such signals and, by consequence, the unique identifiers of the mobile devices within signal range. The mobile application may configure the mobile devices to issue the identification signal periodically. Furthermore, the format of the identification signal may be proprietary to the application such that other nearby devices not running the application do not become involved in the detection process. This also provides a higher level of security to the method of the invention in that it reduces the chances of the proprietary identification signal being spoofed.

When one of the mobile electronic devices 2 is detected as having reached a location on or within a boundary of a geo-fence associated with a carpark, data is communicated to a system or device 20 of a third party associated with the carpark to alert the third party and/or provide the third party with data indicative of an identity of the vehicle and/or its driver to enable the driver to access car-parking spaces allocated to car share vehicles.

In one embodiment, each scanning mobile electronic device 2 communicates with the server 3 or one or more of the detected other mobile electronic devices 2 via any one or any combination of: the short range wireless communication module 18; the wireless communication network 4; the internet 4.

One advantage of the method of the invention is that it does not require constant or frequent use of the geolocation facilities on the mobile device 2 which can quickly drain the battery charge. The method also does not require that each mobile electronic device in the subscription group comprises a smart phone or the like. It is only necessary that each device is capable of issuing a short range wireless signal with a unique identifier and for one of the devices 2 to be able to scan for such signals, store the unique identifiers and communicate with a network system such as system server 3 and/or third party server 20. It does not require the mobile devices to become paired. The method is not unduly hindered by GPS coverage gaps or the like. It is particularly advantageous as it is not essential for it to track users' geolocations over a prolonged time period which, for many users, is considered an infringement of privacy.

The present invention seeks to provide a method, system and a device by which the approximate proximity of users to other users may be recorded over time by means of their associated smart phone, or other associated network/internet connected mobile electronic devices when making their way towards a third party asset such as a car park without recording absolute geolocation except as perhaps as a start point and/or an end point.

In a specific embodiment, following installation and setting up of a mobile device application provided by the application service provider, the method of the invention may comprise the following initial steps at the user's mobile device 2:
1. The user logs in;
2. The application on the user's device 2 informs the system server 3 of the BlueTooth™ address and/or the WiFi™ address associated with this user's account;
3. In response, the mobile device application receives from the server 3 a list of users in the same group(s) with their associated addresses (unique identifiers); and
4. Optionally, the mobile device application receives and registers the geofence of the target third party asset, e.g. carpark.

For a shared vehicle journey, the method may comprise the steps of:
1. The driver opens or invokes the mobile device application on his mobile device 2 and indicates a start of a journey or, optionally, the driver is notified by the server side application that it is time to pick up his/her passenger(s). The driver may subscribe to receive this type of notification from the server side application;
2. The driver's mobile device application will scan for BlueTooth™ and/or WiFi™ devices and list the users or identifiers of devices which have been detected, by comparing their unique identifiers to known identifiers of the subscriber group (this may be implemented on the mobile device side and/or on the server side);
3. Optionally, the driver may select appropriate passenger(s) from a list provided by the server 3 or request the passengers to launch their mobile device applications for the service and attempt to connect with them again;
4. Optionally also, each passenger is notified on his mobile device 2 that the driver has connected with them and they should confirm the journey has indeed begun;
5. Optionally also, the driver can add additional passengers along the route with the same procedure (steps 3-4);
6. Once a journey is started, the mobile device application on the driver's device 2 will check periodically, i.e. every X minutes, that the passenger(s) phones are still detected and will store this information and/or transmit it to the server 3 and/or to the passengers' mobile devices 2. The passenger phones may also perform this step;
7. When the driver's smartphone enters into the car park geofence, the recorded data are uploaded to the server 3 and/or to a third party server 20;
8. The server 3 and/or the third party server 20 will analyse the transmitted data records and apply a metric to verify if the recorded journey data are matching, i.e. confirm that the driver's mobile device 2 and passenger's mobile device 2 have remained in close proximity during the duration of the journey or a major part of it sufficient to afford access to a reserved parking space for HOVs, for example. The metric may not require that devices are determined as being in close proximity for 100% of the periodic scans, but that they are determined as being in close proximity for greater than a threshold number of the periodic scans. The metric may also require that the devices are determined as being in close proximity for at least one of the periodic scans. If a positive decision is obtained, it will amount to a proof of car share that the third party asset management agency requires to provide access to a reserved space. The foregoing example methodology for access to a reserved carparking space, suitably adapted, is applicable to providing access to other scarce assets controlled by third party systems.

In the method of the invention, it is preferred that location and time data are obtained for the start of a journey or at least at a point where a first passenger joins the driver in the vehicle and towards the end of the journey when the vehicle reaches or crosses the designated third part asset geofence and/or the journey scan data are uploaded to the system server 3 and/or the third party server 20. However, the method may include obtaining time and location data for other points in the journey.

For example, the method may include the step of obtaining location and time data for said mobile electronic device 2 continuously, but such data is preferably gathered periodically and may only be gathered in response to trigger events such as when the device 2 is determined as having reached or crossed into one or more geo-fenced areas or regions.

Once the mobile device 2 is determined to have reached a point on the boundary or crossed said boundary to be located within the geo-fenced area of the carpark, the device 2 itself or, more preferably, the system server 3 communicates to a system or device such as the server 20 of the third party entity associated with the carpark (and the geo-fence around it) to alert said third party entity that the user/vehicle wishes to access the carpark. It will be understood that the size of the geo-fence boundary may be considerably larger than the asset it surrounds and that the size may be chosen to allow time for a user device 2 to be detected within the geo-fenced area and for alert messages to be sent from the system server 3 to the third party entity server 20. The geo-fence may surround more than one asset. For example, in a town with multiple local authority carparks, the geo-fence may be selected to surround all of the carparks in the town rather than an individual carpark.

The advance information or data provided to the third party carpark entity server 20 may comprise a vehicle registration number, an identity of the vehicle driver or any other information that enables the cap park entity system to identify that the user's vehicle is entitled to take advantage of the priority services. The use of the vehicle registration plate as the advance data communicated to the server 20 of the carpark entity may be advantageous in that it can be automatically read using a registration plate recognition system and thus may enable the user of the vehicle to automatically access the priority services without the intervention of a carpark employee.

Issues of fraudulent use of the system of the invention may arise where a vehicle user registers two mobile devices with the server 3 of the system and then carries both within his vehicle. To address such concerns, the system may be configured to continue to obtain proximity data for the mobile devices 2 for a predetermined period after the advance data has been communicated to the carpark entity server 20. This predetermined period of time may be triggered later by a message from the carpark entity server 20 to the system server 3 indicating that the vehicle has entered the carpark. The further comparison of proximity data may reveal that the devices 2 remain in close proximity and are thus being held by one user. In the event that it is detected that the proximity of the mobile devices 2 is such that they are no longer close, it may be inferred that they are held by different users and that the vehicle was indeed occupied by multiple occupants. To further enhance security and to prevent or deter fraud, the users of the devices 2 may be required to enter biometric data such as a fingerprint using a fingerprint scanning application on their device 2 at any point during the process, but more particularly during an initial period prior to initiation of a tracking procedure and/or during a termination or predetermined period following parking. Other types of biometric data may be utilized such as voice recognition or iris recognition. Other forms of identification may be utilized such as a user's financial authority, e.g. contract phone/tablet connection bill, or because the device 2 was issued to them by their employer.

It will be appreciated that the location and time data obtained by the system server 3 for the mobile devices 2 may be utilized to determine other characteristics of the movements and locations of the devices 2 including distance of travel.

In one embodiment, the system is enhanced to provide means for proving that a device 2 is currently in the presence of the authorised user/owner whilst a journey share is being claimed to be taking place. This may be achieved by configuring the system server 3 to send requests challenging users for any one or more of: sensitive or security information known only to them, perform a specific action on their device 2; or telephoning the device or telephoning all the devices claimed to be part of the current journey share.

In general, the invention is concerned with a computer implemented method of determining that two or more members of a subscription group are in close proximity to each other. The method comprises the steps of enabling a mobile electronic device of at least one member of the subscription group to use a short range wireless communication signal to scan for other mobile electronic devices. In response to scanning, the scanning mobile electronic device receives and stores a unique identifier for each detected other mobile electronic device. A processor compares each stored unique identifier with known unique identifiers of mobile electronic devices of members of said subscription group. As a consequence of the comparing step, the processor determines that two or more members of the subscription group are in close proximity to each other if at least one of the stored unique identifiers matches one of the known unique identifiers of mobile electronic devices of members of the subscription group. This method can be used to infer that the two or more members of the group are sharing the same vehicle for a journey. When one of the mobile electronic devices is detected as having reached a location on or within a boundary of a geo-fence associated with a carpark, data is communicated to a system or device of a third party associated with the carpark to alert the third party and/or provide the third party with data indicative of an identity of the vehicle and/or its driver to enable the driver to access car-parking spaces allocated to car share vehicles.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

What is claimed is:

1. A computer implemented method of determining that two or more members of a subscription group comprising a plurality of members are in close proximity to each other, the method comprising the steps of:
    enabling a mobile electronic device of at least one member of the subscription group to use a short range wireless communication module to detect other mobile electronic devices within signal range of its short range wireless communication module and, in response to detecting, to receiving and storing a unique identifier for each detected other mobile electronic device;
    at a processor, comparing each stored unique identifier for said detected other mobile electronic devices with a plurality of known unique identifiers of mobile electronic devices of said plurality of members of said subscription group; and
    determining that two members of the subscription group are in close proximity to each other if one of the stored unique identifiers for said detected other mobile electronic devices matches one of the plurality of known unique identifiers of mobile electronic devices of said plurality of members of said subscription group even if the stored unique identifiers for said detected other mobile electronic devices includes a unique identifier belonging to a mobile electronic device of a person who is not a subscription group member.

2. The method of claim 1, further comprising the steps at the processor of:
    comparing each stored unique identifier for said detected other mobile electronic devices and a unique identifier of the detecting mobile electronic device with known unique identifiers of mobile electronic devices of members of said subscription group; and
    determining that two or more members of the subscription group are in close proximity to each other if:
        the unique identifier of the detecting mobile electronic device matches one of the known unique identifiers of mobile electronic devices of members of said subscription group; and
        at least one of the stored unique identifiers for said detected other mobile electronic devices matches one of the known unique identifiers of mobile electronic devices of members of said subscription group.

3. The method of claim 1, wherein the detecting mobile electronic device is arranged to transmit its own unique identifier and the unique identifiers of detected other mobile electronic devices to a server or one or more of the detected other mobile electronic devices.

4. The method of claim 3, wherein the server or the one or more of the detected other mobile electronic devices determines an identity of the subscription group from the identifier of the detecting mobile electronic device.

5. The method of claim 1, wherein the detecting mobile electronic device periodically detects other mobile electronic devices and receives and stores a unique identifier for each detected other mobile electronic device at each periodic detection step.

6. The method of claim 5, wherein the detecting mobile electronic device implements the steps of claim 1 at each detection step and stores the resulting data.

7. The method of claim 1, wherein the short range wireless communication module is one or both of a BlueTooth and a WiFi wireless module.

8. The method of claim 7, wherein the unique identifiers of the mobile electronic devices comprise BlueTooth Medium Access Control (MAC) addresses and/or a WiFi MAC addresses.

9. The method of claim 1, wherein it does not require the detecting mobile electronic device to pair with any other mobile electronic device.

10. The method of claim 1, wherein the detecting mobile electronic devices communicates with a server or one or more of the detected other mobile electronic devices via any one or any combination of: a short range wireless communication module; a wireless communication network; the internet.

11. The method of claim 1, wherein a subscription group comprises a group of two or persons who have signed up to a service provided by an application service provider.

12. The method of claim 1, further comprising the step of loading a mobile device application onto the detecting mobile electronic device to enable said detecting mobile electronic device to implement the steps of claim 1.

13. The method of claim 12, wherein the mobile device application, based on the unique identifier of the detecting mobile electronic device, retrieves the unique identifiers for all members of the subscription group.

14. The method of claim 1, further comprising the steps of:
  obtaining location and time data for a mobile electronic device of at least one member of the subscription group;
  determining from said location and time data a location of the mobile electronic device relative to a geo-fence associated with a third party asset;
  determining that said mobile electronic device has reached a location on or within a boundary of said geo-fence; and
  in response to a determination that said mobile electronic device has reached a location on or within a boundary of said geo-fence, communicating data to a system or device of the third party associated with the geo-fence, said communicated data alerting said third party system or device of the foregoing determination, and/or providing data relating to an identity and/or an attribute of an object associated with the mobile electronic device to enable the third party system or device to provide the user of the mobile electronic device with access to the third party asset or a service provided by said third party asset.

15. The method of claim 14, further comprising the step of:
  processing the periodic stored data to determine that the two or more of the subscription group members have been in close proximity for a period of a journey in a same vehicle.

16. The method of claim 1, wherein, when the step of comparing a stored unique identifier for one of said detected mobile electronic devices with the plurality of known unique identifiers of the mobile electronic devices of said plurality of members of said subscription group fails to make a match, the failed unique identifier is disregarded as belonging to a mobile electronic device of a person who is not a subscription group member.

17. A computer implemented method of determining that two or more persons are in close proximity to each other, the method comprising the steps of:
  enabling a mobile electronic device of at least one person to use a short range wireless communication module to detect other mobile electronic devices and, in response to detecting, to receiving and storing a unique identifier for each detected other mobile electronic device;
  at a processor, comparing each stored unique identifier with known unique identifiers of mobile electronic devices of previously identified persons; and
  determining that two previously identified persons are in close proximity to each other if one of the stored unique identifiers matches one of the known unique identifiers of mobile electronic devices of previously identified persons even if the stored unique identifiers for said detected other mobile electronic devices includes a unique identifier belonging to a mobile electronic device of a person who is not a previously identified person.

18. A mobile electronic device for determining that two or more members of a subscription group are in close proximity to each other, the device comprising:
  a memory storing machine readable instructions;
    a processor configured to execute said machine readable instructions to:
    use a short range wireless communication module to detect other mobile electronic devices and, in response to detecting, to receiving and storing a unique identifier for each detected other mobile electronic device;
    compare each stored unique identifier with known unique identifiers of mobile electronic devices of members of said subscription group; and
    determine that two members of the subscription group are in close proximity to each other if one of the stored unique identifiers matches one of the known unique identifiers of mobile electronic devices of members of said subscription group, even if the stored unique identifiers for said detected other mobile electronic devices includes a unique identifier belonging to a mobile electronic device of a person who is not a subscription group member.

19. A system for determining that two or more members of a subscription group are in close proximity to each other, the system comprising;
  a server having a memory storing machine readable instructions and a processor configured to execute said machine readable instructions;
  a mobile electronic device, said device having a memory storing machine readable instructions and a processor configured to execute said machine readable instructions;
  the server and the mobile electronic device being configured to communicate with each other over a network;
  wherein the server and the mobile electronic device interoperate to:
    use a short range wireless communication module to detect other mobile electronic devices and, in response to detecting, to receiving and storing a unique identifier for each detected other mobile electronic device;

compare each stored unique identifier with known unique identifiers of mobile electronic devices of members of said subscription group; and determine that two members of the subscription group are in close proximity to each other if one of the stored unique identifiers matches one of the known unique identifiers of mobile electronic devices of members of said subscription group, even if the stored unique identifiers for said detected other mobile electronic devices includes a unique identifier belonging to a mobile electronic device of a person who is not a subscription group member.

20. A non-transitory computer readable medium storing machine readable instructions executable by a processor of a mobile electronic device or a server for implementing the steps of:

using a short range wireless communication module to detect other mobile electronic devices and, in response to detecting, to receiving and storing a unique identifier for each detected other mobile electronic device;

comparing each stored unique identifier with known unique identifiers of mobile electronic devices of members of said subscription group; and determining that two members of the subscription group are in close proximity to each other if at least one of the stored unique identifiers matches one of the known unique identifiers of mobile electronic devices of members of said subscription group, even if the stored unique identifiers for said detected other mobile electronic devices includes a unique identifier belonging to a mobile electronic device of a person who is not a subscription group member.

* * * * *